(12) United States Patent
Zarate et al.

(10) Patent No.: US 11,256,244 B2
(45) Date of Patent: Feb. 22, 2022

(54) ADAPTIVE ALARM AND DISPATCH SYSTEM USING INCREMENTAL REGRESSIVE MODEL DEVELOPMENT

(71) Applicant: Inventus Holdings, LLC, Juno Beach, FL (US)

(72) Inventors: Boris A. Zarate, Palm Beach Gardens, FL (US); Sentibaleng M. Ncube, Greenacres, FL (US); Hooman Yousefizadeh, Port St. Lucie, FL (US); Yi Li, Palm Beach Gardens, FL (US); Donville Smith, Royal Palm Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 546 days.

(21) Appl. No.: 15/888,606

(22) Filed: Feb. 5, 2018

(65) Prior Publication Data
US 2019/0243350 A1 Aug. 8, 2019

(51) Int. Cl.
*G05B 23/02* (2006.01)
*G06F 11/30* (2006.01)

(52) U.S. Cl.
CPC ....... *G05B 23/0254* (2013.01); *G05B 23/024* (2013.01); *G05B 23/027* (2013.01); *G06F 11/3006* (2013.01)

(58) Field of Classification Search
CPC .............. G05B 23/0254; G05B 23/024; G05B 23/027; G06F 11/3006
See application file for complete search history.

(56) References Cited

U.S. PATENT DOCUMENTS

| | | | |
|---|---|---|---|
| 6,904,328 B2 | 6/2005 | Rietman et al. | |
| 7,187,989 B2 | 3/2007 | Attarwala | |
| 7,450,225 B1 * | 11/2008 | Liu | G01B 11/0625 356/123 |
| 7,461,063 B1 | 12/2008 | Rios | |
| 7,519,566 B2 | 4/2009 | Prigogin et al. | |
| 7,640,145 B2 | 12/2009 | Wegerich et al. | |

(Continued)

FOREIGN PATENT DOCUMENTS

WO 2009048963 4/2009

*Primary Examiner* — Alexander Satanovsky
(74) *Attorney, Agent, or Firm* — Fleit Intellectual Property Law; Jeffrey N. Giunta; Jon Gibbons

(57) ABSTRACT

Systems and methods for monitoring an operational system. An initial set of sensor data is accumulated from a system over a substantially shorter time than is required to collect data to characterize a regression model for an operating parameter of the system. An initial regression model is created based on the initial set of sensor data. A subsequent set of sensor data is received from the at least one sensor after creating the initial regression model. An expected dependent value for the subsequent independent value is determined using the initial regression model. An operator is prompted to update the initial regression model based on a difference between a subsequent dependent value and the expected dependent value. The initial regression model is updated to incorporate the subsequent set of sensor data. A notification is provided based on a difference between presently received sensor data and the updated regression model.

20 Claims, 7 Drawing Sheets

(56) References Cited

U.S. PATENT DOCUMENTS

| | | |
|---|---|---|
| 7,966,152 B2 * | 6/2011 | Stluka ................ G05B 23/0232 |
| | | 702/182 |
| 8,005,645 B2 | 8/2011 | Emigholz et al. |
| 8,180,622 B2 | 5/2012 | Nasle |
| 8,433,450 B2 | 4/2013 | Francino et al. |
| 8,600,917 B1 | 12/2013 | Schimert et al. |
| 8,996,334 B2 | 3/2015 | Trejo Sanchez et al. |
| 9,251,472 B1 | 2/2016 | Linowes et al. |
| 9,256,224 B2 | 2/2016 | Herzog |
| 9,411,326 B2 | 8/2016 | Tiwari et al. |
| 9,443,194 B2 | 9/2016 | Chu et al. |
| 9,514,022 B1 | 12/2016 | Basak et al. |
| 9,519,874 B2 | 12/2016 | Macek et al. |
| 9,542,646 B1 | 1/2017 | Baughman et al. |
| 9,569,298 B2 | 2/2017 | Hampapur et al. |
| 9,582,636 B2 | 2/2017 | Foiret et al. |
| 9,582,781 B1 | 2/2017 | Kearns et al. |
| 9,700,237 B2 | 7/2017 | Niemimaki |
| 2005/0246135 A1 | 11/2005 | Van Harn |
| 2005/0273277 A1 | 12/2005 | Ridnour et al. |
| 2008/0082295 A1 * | 4/2008 | Kant .................... G05B 23/024 |
| | | 702/179 |
| 2008/0082308 A1 * | 4/2008 | Kant .................. G05B 23/0254 |
| | | 703/12 |
| 2009/0097537 A1 * | 4/2009 | Miller ................ G05B 23/024 |
| | | 375/228 |
| 2013/0080760 A1 | 3/2013 | Li et al. |
| 2015/0112505 A1 * | 4/2015 | Collins ................ G06Q 10/04 |
| | | 701/1 |
| 2015/0134315 A1 * | 5/2015 | Sarmiento ............. G16B 35/20 |
| | | 703/11 |
| 2015/0248510 A1 | 9/2015 | Meagher et al. |
| 2015/0302318 A1 | 10/2015 | Chen et al. |
| 2016/0350671 A1 | 12/2016 | Morris, II et al. |
| 2018/0130198 A1 * | 5/2018 | Kikuchi ................ G06T 7/0004 |

* cited by examiner

ADAPTIVE ALARM AND DISPATCH SYSTEM USING INCREMENTAL REGRESSIVE MODEL DEVELOPMENT

FIELD OF THE DISCLOSURE

The present disclosure generally relates to monitoring operational systems, and more particularly to automatically monitoring systems based on incrementally developing regression models after modifications to the operational system.

BACKGROUND

Calibrated regression models are able to be used to assist in the monitoring of operational systems in order to detect operating anomalies that may indicate potential issues or maintenance requirements. Regression models in an example include a mathematical equation that relates one or more monitored values of a system with another monitored value of the system. In an example, components of a wind turbine may exhibit a linear relationship between the present ambient temperature of the wind turbine and a temperature of a particular bearing within the wind turbine. In an example, a regression model that is suitable for anomaly detection is established, or calibrated, by allowing the wind turbine to operate over a range of ambient temperatures and measuring the ambient temperature and the temperature of that bearing while the wind turbine is operating at each of those measured ambient temperatures. A regression model for this relationship is then created by determining a mathematical relationship between the observed bearing temperatures and ambient temperatures. In the above example of a bearing within a wind turbine, providing a particular ambient temperature value as an input to the regression model will produce an expected bearing temperature for that bearing at the provided ambient temperature.

After the bearing temperatures in this example have been observed for a sufficiently large range of ambient temperatures and the regression model is created or updated to include bearing temperature measurements that were also made while operating at those ambient temperatures, the regression model is said to be definitive. In an example, a definitive regression model for a particular measurement is a model that is sufficiently developed so that an anomaly is able to be reliably determined based on a deviation between a measured value for that particular measurement and an expected value for that particular measurement that is calculated by the regression model.

One use for a regression model is regression based anomaly detection. In an example, regression based anomaly detection for a parameter of an operational system uses a regression model that has become definitive, or calibrated, by having incorporated measurements covering a sufficient range of measured values while the system being observed is operating normally. An example of a regression based anomaly detection process that is based on above example of a wind turbine bearing detects a bearing overheating anomaly. In such an example, an alarm or other notification is provided when the monitored bearing becomes too hot. Rather than have a single overall over-temperature threshold that does not depend on ambient temperature, a regression based anomaly detection technique refines the range of observed parameters that trigger an alarm or notification based on values of present input parameters such as ambient temperature. A regression based anomaly detection process determines an expected value for the bearing temperature based on the present ambient temperature and if the monitored bearing temperature exceeds that expected value by a certain amount, an alarm or other detected anomaly notification is provided.

In general, regression models used with regression based anomaly detection techniques are rebuilt as a result of many conditions, such as after any major overhaul of the operational system being monitored or when the measurement systems monitoring the operation of that operational system are recalibrated. In general, rebuilding or creating a regression model uses measurement data that was collected over a long time period in order to capture a wide range or input values, such as ambient conditions.

Regression models used in regression based anomaly detection are sometimes initially created with manually selected "good" datasets. The manual selection of a suitably "good" dataset can be time consuming for a highly skilled expert who is needed to properly identify desired data values and exclude potentially anomalous data. For example, a "good" dataset has to be identified from collected measurement data and has to include a sufficiently wide range of input values and also has to include corresponding measured values that represent proper operation that have no anomalies themselves.

Due to the invalidation of prior models after some events, such as a major overhaul or monitoring system recalibration, a previously existing regression model cannot be used for regression based anomaly detection. Because of the time required to collect sufficient data to build a regression model based on the modified system, the benefits of automated monitoring using regression based anomaly detection are generally not available until a suitable set of data is collected after the modified system is placed back into operation. During the time needed to collect the dataset used to generate a new, regression model that is calibrated to the modified system, the operational system is more susceptible to undetected anomalies due to the unavailability of an automated regression based monitoring detection process until the collection of a suitably large set of data that is needed to create and calibrate a regression model is complete.

In more complex operational systems, a large number of components and parameters are monitored with the aid of regression based anomaly detection processes. In such systems, a large number of regression models are used for regression based anomaly detection. The task of manually selecting suitable datasets to be used to generate a large number of regression models in such complex operation systems can become particularly onerous.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
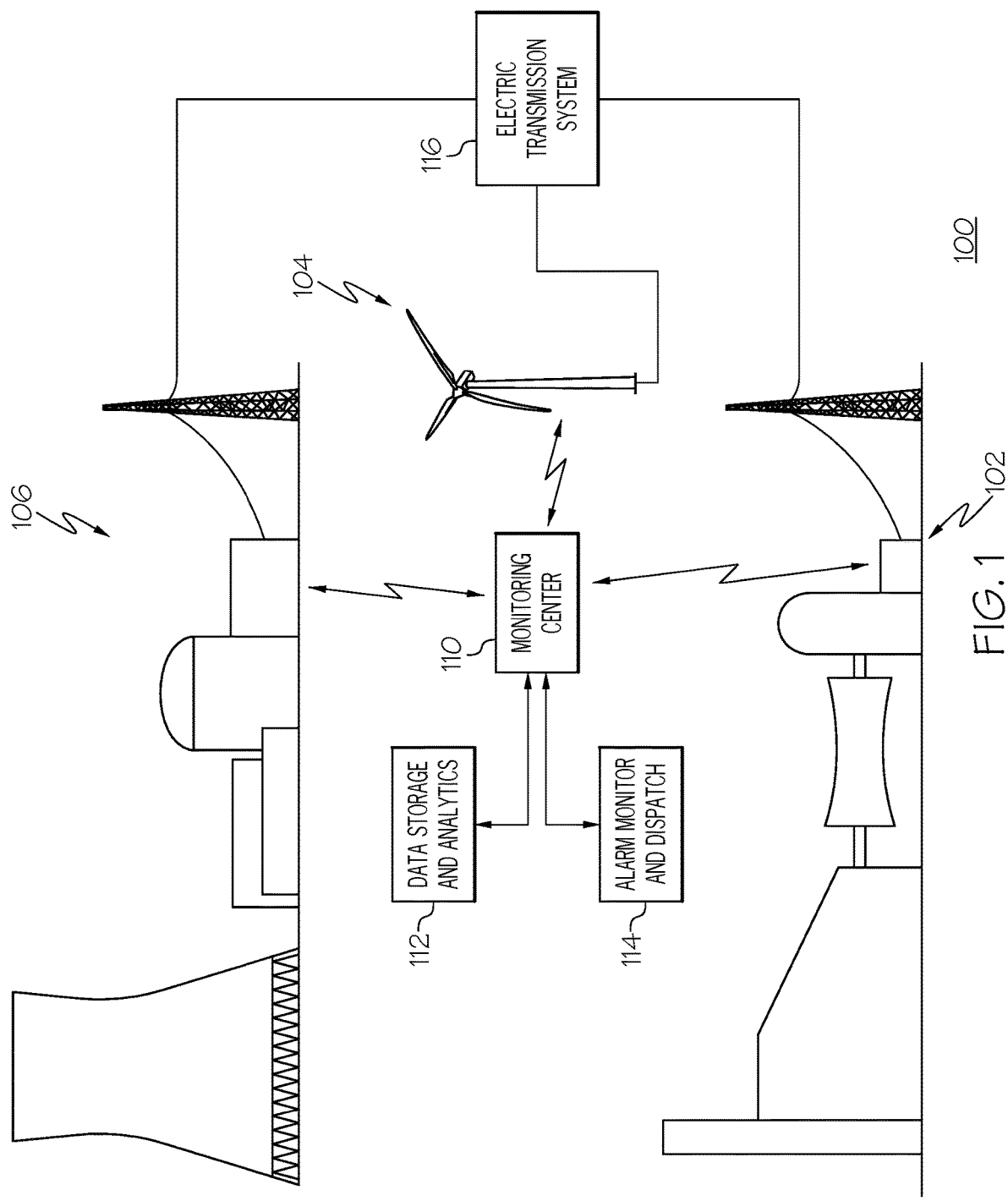
FIG. 1 illustrates an example electric generation and facility monitoring system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods begin operation of a regression based anomaly monitoring process prior to fully characterizing an operational system being monitored for anomalies. These systems and methods automate the processes associated with rebuilding or generating a regression model for a regression based anomaly detection system after, for example, modification of an operational system for which data is not available for regression model calibration. The automation of the regression model rebuilding process in an example reduces the interaction by a system administrator, i.e., a system operations expert, in rebuilding a regression model after an operational system has significant maintenance, the monitoring systems have been recalibrated, prior operational data has been invalidated or is not available, or any combinations of these. These systems and methods operate to automatically reconfigure the regression model(s) used for regression based anomaly detection and starts operations of an initial regression based anomaly detection system prior to fully characterizing the system being modeled by the regression model. Beginning to use a regression model for regression based anomaly detection prior to fully calibrating the regression model advantageously allows an automated regression based anomaly detection system to aid in anomaly detection prior to fully characterizing the system being monitored and while data is being collected to fully calibrate the regression model.

Once the initial regression based anomaly detection system begins operation, sensor data reporting measurements made sensors in a monitoring system monitoring the operational system are automatically or semi-automatically incorporated into the regression model in order to further the calibration of the regression model. An algorithm is used to evaluate characteristics of newly received sensor data to determine whether an system administrator should review the newly received sensor data. In an example, an algorithm determines whether newly received sensor data is: 1) consistent with the regression model and thus does not require further attention; 2) whether the newly received sensor data should be automatically incorporated into the regression model; or 3) whether an operator should review the newly received sensor data to specify how the newly received sensor data should be handled. The automatic evaluation of newly received sensor data to restrict the amount of data that an operator has to evaluate as a regression model is being calibrated advantageously reduces the amount of work required by a system expert to evaluate data collected on an operational system while a regression model is being calibrated. This processing of newly received sensor data continues until the regression model is identified as being definitive, or sufficiently calibrated to the point where further sensor data is no longer automatically evaluated for automatic or semi-automatic incorporation into the regression model.

In some examples, the below described systems and methods use reduced amounts of simplified interaction with a system administrator to evaluate newly received sensor data that deviates from an expected value that is calculated by the present state of the regression model. The amount of interaction with the system administrator is reduced by, for example, automatically using newly received sensor data that meets certain criteria are either automatically disposed of and not incorporated into the regression model or are automatically incorporated into the regression model by rebuilding the regression model with the combination of the newly received sensor data and previously accumulated sensor data.

In some examples, newly received sensor data that deviates from expected values calculated by the regression model and does not meet criteria for automatic inclusion into the regression model is reported to a system administrator with a simple message that presents the expected values calculated by the regression model, the measured values contained within the sensor data, other relevant information, or combinations of these. The system administrator is then able to evaluate this data, which may include performing further analysis or investigation of the operational system, and decide which actions, if any, should be taken. When the system administrator receives such a message, the system administrator is able to decide whether the new sensor data should be incorporated into the regression model (e.g., such as by rebuilding the regression model incorporating the new data with previously accumulated sensor data), whether the new sensor data may in fact indicate an anomaly and should be further reported and/or investigated, whether the new sensor data should just be discarded, whether other actions should be taken, or combinations of these.

In an example based on the above described system that include sensor data containing measurements of the present temperature of a bearing in a wind turbine along with measurements of the present ambient temperature, the ambient temperature is an input value and the bearing temperature is a measured value. In an example, an initial regression model is built with an initial set of sensor data that covers an ambient temperature range of twenty degrees Celsius (20° C.) to forty degrees Celsius (40° C.). Receipt of new sensor data with an ambient temperature of fifteen degrees Celsius (15° C.) in one example causes automatic rebuilding of the regression model using this new data point. In response to receiving this new data that includes a measured present bearing temperature that deviates from an expected bearing temperature calculated by the regression model for the ambient temperature present in this new data, a prompt is provided to a system administrator requesting instructions for further processing of this newly received data. In various examples, newly received sensor data that has measured values that deviate from expected values calculated by the regression model are able to have input values that are within the range of observed values that were used to build the present regression model, and in some examples may also include input values that are outside the range of input values used to build the present regression model.

In an example, the above described processing of subsequently received sensor data to determine whether it should be incorporated into the regression model or handled otherwise continues until the model is determined to be definitive. In an example, a system administrator is prompted to evaluate whether the regression model is definitive. A regression model is determined to be definitive in an example when it is judged to be adequately calibrated for continued use without considering further updating of the model with additional sensor data. The system administrator in an example is prompted to consider whether the regression model is definitive after a particular time duration elapses since the regression model was last updated or that particular time duration elapses since the model was initially built without any updating. The time duration since last updating or creating without updating is generally chosen to be long enough to include a range of operational circumstances and conditions for the operational system being monitored.

FIG. 1 illustrates an example electric generation and facility monitoring system 100, according to an example. The example electric generation and facility monitoring system 100 includes various electrical generation facilities, including a combustion turbine power plant 102, a wind turbine electric generator 104, and a nuclear power electric generator plant 106. Each of these electric generation facilities in this example provides electric power to an electric transmission system 116. Each of these electric generation facilities are examples of an operational system.

Each of these electric generator facilities in this example is monitored by a monitoring center 110. In an example, the monitoring center 110 receives sensor data containing measurements of parameters that are measured by sensors within monitoring equipment at each electric generator facility. The monitoring center 110 in an example further detects and reports anomalous conditions. In some examples, the monitoring center 110 incorporates regression based anomaly detection processes to automatically detect anomalous conditions based on analysis of sensor data that is reported within the voluminous amounts of sensor data that is generally collected for an operating electrical generation facility.

The example electric generation and facility monitoring system 100 depicts these various facilities to illustrate the potential diversity of facilities that are able to be monitored by a regression based anomaly detection system. In general, a monitoring center 110 is able to monitor data collected from any number of operational systems. In the illustrated example, the monitoring center 110 receives sensor data from a number of facilities. In a further example, each facility is able to have its own monitoring center located remotely from, or collocated with, the facility it is monitoring.

The monitoring center 110 operates with a data storage and analytics module 112. The data storage an analytics module in an example accumulates sensor data received from the various operational systems and performs automated analysis of that sensor data. In some examples, regression models for some parameters measured by sensors in the operational systems are built or updated using data that is stored in the data storage and analytics module 112. Regression model generation and updating in some examples is able to be performed by components within the data storage and analytics module 112, within the monitoring center 110, at other facilities, or distributed across combinations of these facilities.

In various examples, a particular data storage and analytics module 112 is able to be associated with one monitoring center 110, or a single data storage and analytics module 112 is able to support several monitoring centers 110. A single data storage and analytics module 112 that supports multiple monitoring centers 110 is able to support additional automated analysis of data produced by different but similar systems in order to more completely characterize various systems. In some examples, the data storage and analytics module 112 is able to be part of a larger enterprise database system that is managed by an enterprise, implemented via a cloud based architecture, implemented via any suitable system or architecture, or combinations of these.

The monitoring center 110 provides notifications of detected anomalies to an alarm monitor and dispatch system 114. The alarm monitor and dispatch system 114 in an example is able to alert personnel at the facility associated with the detected anomaly. In some examples, each facility is associated with its own separate alarm monitor and dispatch system 114 that is able to be located remotely from, or collocated with, that facility.

Figure 2:
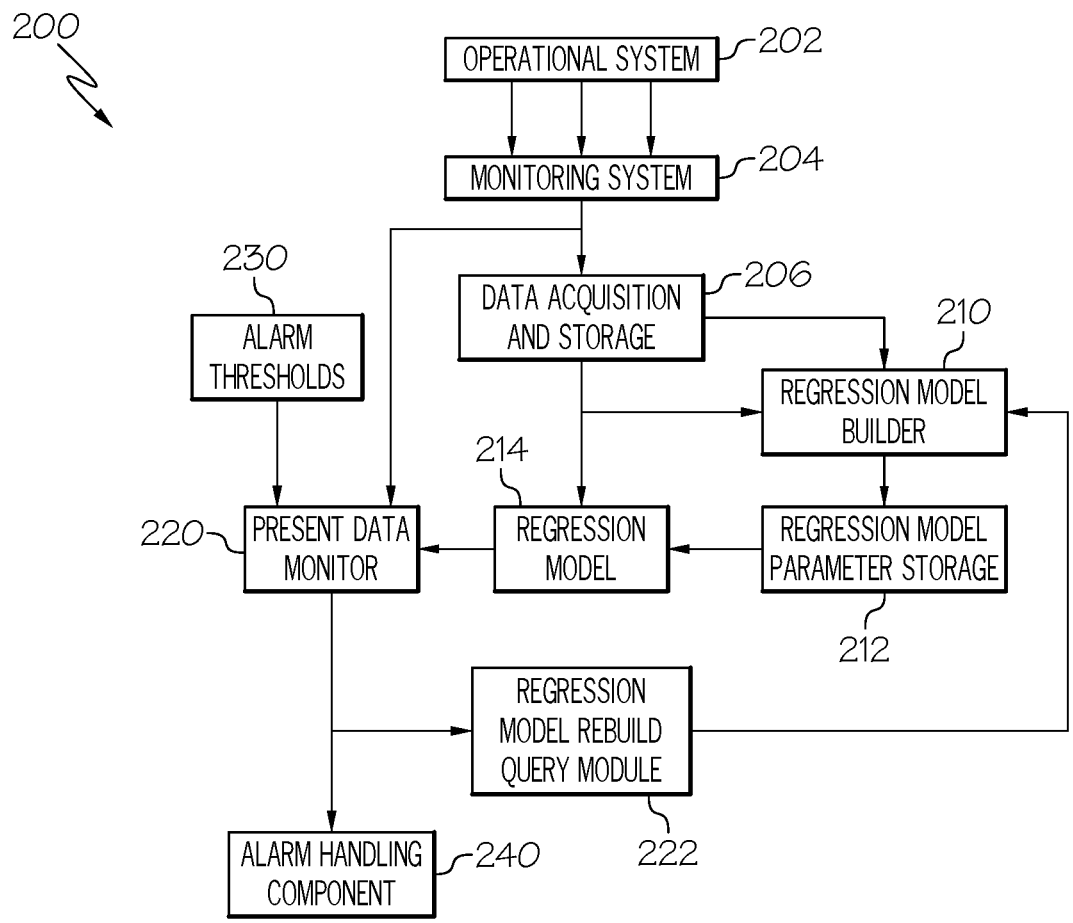
FIG. 2 illustrates a regression based anomaly detection data flow and block diagram, according to an example.

FIG. 2 illustrates a regression based anomaly detection data flow and block diagram 200, according to an example. The regression based anomaly detection data flow and block diagram 200 is described with reference to the example electric generation and facility monitoring system 100, discussed above. The regression based anomaly detection data flow and block diagram 200 depicts components of an overall system that includes an operational system, monitoring system, and an anomaly detection processor that performs a regression based anomaly detection process such as is described above with regards to example electric generation and facility monitoring system 100.

The regression based anomaly detection data flow and block diagram 200 includes an operational system 202, such as one of the above described electric generation systems. A monitoring system 204 is generally associated with the operational system 202 and includes sensors that monitor various components of the operational system 202.

An example of a monitoring system 204 is a system with sensors that monitor and measure parameters associated with a wind turbine electric generator 104, as is discussed above. In such an example, the monitoring system 204 includes sensors that measure the present temperature of a particular bearing of that wind turbine electric generator 104, and reports the measured bearing temperature to the monitoring center 110. The monitoring system 204 in such an example also includes sensors that measure the present ambient temperature of the wind turbine electric generator 104. That monitoring system 204 in this example also reports the present ambient temperature to the monitoring center 110.

The monitoring system 204 in an example provides sensor data containing values of measured parameters of the operation system 202 to a data acquisition and storage system 206. The data acquisition and storage system 206 in an example includes at least part of a sensor data receiver that is a component of the above described data storage an analytics module 112. The data acquisition and storage system 206 in an example stores and accumulates some or all of the data reported by the monitoring system 204. In some examples, a data acquisition and storage system is able to receive and store data reported by one or more monitoring systems 204 that are monitoring any number of operational systems 202.

The data acquisition and storage system 206 provides presently received sensor data, stored sensor data, or combinations of these, to a regression model builder 210. The regression model builder 210 in an example accesses stored sensor data within the data acquisition and storage system 206. The regression model builder 210 in such an example is able to create regression models based on that previously received sensor data, which includes sets of sensor data that were received from the monitoring system 204 over various time durations. In some examples, the regression model builder 210 is able to create an initial state of a regression model, which includes creating a new regression model based on an initial set of accumulated sensor data. The regression model builder 210 in further examples is able to update a previously created regression model based on additional sensor data that augments the sensor data that was previously used to create or update an existing regression model.

The regression model builder 210 produces regression model parameters that are stored in a regression model storage 212. The regression model storage 212 in an example is able to store parameters that define a number of regression models that model relationships between or among sensor data collected and reported by the various sensors within the monitoring system 204.

The data acquisition and storage system 206 also provides presently received data to a regression model 214. The regression model 214 in an example calculates expected values of measured parameter data based upon input data values. The regression model 214 in an example includes a number of regression models that each corresponds to a particular measured value monitored by sensors within the monitoring system 204. The regression model 214 in an example calculates expected values that correspond to the actual measured values reported within sensor data received from the monitoring system 204. These calculated expected values are based on the particular values of input quantities contained within sensor data received from the monitoring system 204. The regression model 214 provides these calculated expected values to a present data monitor 220.

The present data monitor 220 in an example includes at least a part of a sensor data receiver and receives measured values of parameters contained within received sensor data from the monitoring system 204 and compares those measured values to the calculated expected values produced by the regression model 214. Differences between the received measured values in the sensor data and the expected value calculated by the regression model may indicate an anomaly in the operational system 202. An indication of such an anomaly in some examples leads to an alarm condition being declared for the components of the operational system 202 associated with the measured value that deviates from the expected value calculated by the regression model 214. Such alarm conditions are provided to an alarm handling component 240. The alarm handling component in some examples provides notifications to particular entities of the deviation between a measured value and an expected value so that the condition can be further evaluated or investigated.

In some examples, alarm thresholds 230 are stored for at least some of the measured quantities that are reported in the sensor data received by the monitoring system 204. These alarm thresholds 230 in an example define magnitudes of differences between the measured values and the calculated expected values that are acceptable and should not cause a notification of a detected anomaly, such as asserting an alarm. In such examples, when the difference between a measured value and the calculated expected value is less than the alarm threshold for that particular measured quantity, an alarm is not asserted. An anomaly notification is provided, such as by asserting an alarm condition, to the alarm handling component 240, however, when the difference between a measured value and the calculated expected value is above the alarm threshold for that particular measured quantity.

Anomaly notifications in some examples are further provided to a model rebuild query module 222. In an example, the model rebuild query module 222 receives anomaly notifications when the anomaly is detected by a regression based anomaly detection process that uses a regression model that has not been determined to be definitive. The model rebuild query module 222 in an example determines whether to provide a notification to a relevant entity, such as a system administrator, of the alarm condition and prompts that entity with options for handling the received measured values that deviated from the expected values calculated by the regression model 214. As described in further detail below, such a prompt is able to allow the entity to indicate that the measured values contained within the received sensor data are to be incorporated into the regression model, discarded, processed in another way, or combinations of these. In an example, the model rebuild query module 222 is able to provide a command to the regression model builder 210 to rebuild the regression model associated with the measured value to incorporate the measured value into the dataset upon which the regression model is based.

Figure 3:
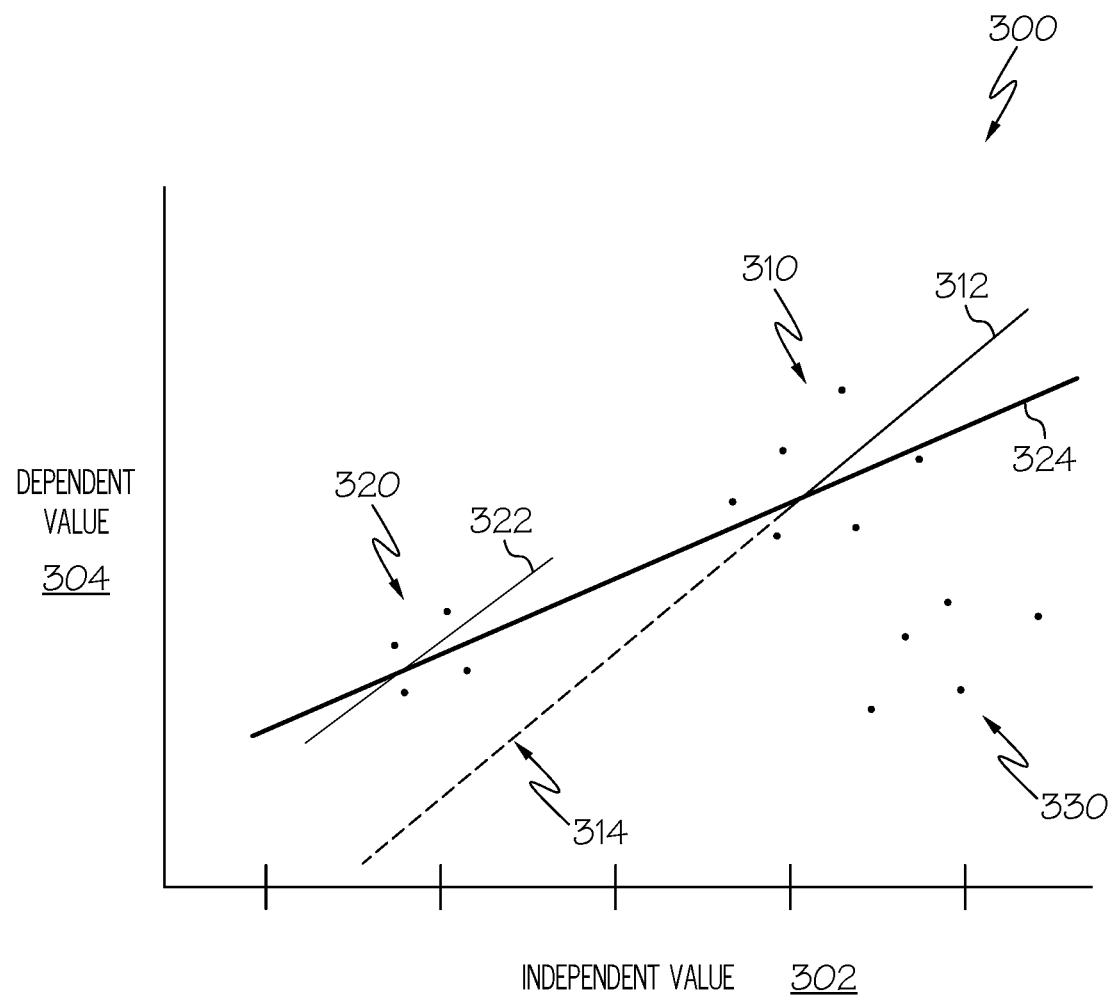
FIG. 3 illustrates an example set of sensor data, according to an example.

FIG. 3 illustrates an example set of sensor data 300, according to an example. The example set of sensor data 300 is presented as a two-dimensional graph with a horizontal independent value axis 302 and a vertical dependent value axis 304. An example of such an example set of sensor data is the above described bearing temperature data for a wind turbine, where the ambient temperature corresponds to values on the independent value axis 302 and the measured bearing temperature is indicated on the dependent value axis 304.

The example set of sensor data 300 depicts three sets of sensor data. A first set of sensor data 310, a second set of sensor data 320, and a third set of sensor data 330. In an example, the first set of sensor data 310 is an initial set of sensor data that is used to create an initial state of a regression model. In the illustrated example, a linear relationship between independent values and dependent values is determined based on the first set of sensor data 310. The initial state of the regression model that reflects the first set of sensor data 310 in this example is indicated by the first regression model line 312.

Referring to the regression based anomaly detection data flow and block diagram 200, the regression model 214 calculates expected values corresponding to the measured data using a linear relationship indicated by the first regression model line 312 that is determined according to the first set of sensor data 310. The regression model 214 is able to calculate expected values corresponding to a measured value according to this linear relationship using the independent value, such as ambient temperature, to determine a dependent value, such as the expected value of the bearing temperature given that ambient temperature value. Such calculations are able to be performed with independent values that are either inside or outside of the range of independent values contained within the data values that are in the first set of sensor data 310.

The second set of sensor data 320 includes data values with independent values that are outside the range of independent values contained within the first set of sensor data 310. A second line 322 indicates a linear model that only represents the second set of sensor data 320. The second line 322 indicates a pattern that is different from the first regression model line 312. The example set of sensor data 300 depicts a first regression model line extended portion 314 that extends to values of the independent values that include the independent values contained within the second set of sensor data 320. The dependent values in the second set of sensor data 320 are shown to be higher than the expected value that is calculated according to the first regression model line extended portion 314. In this example, such as difference causes an anomaly to be detected, which causes an alarm to be asserted.

In various examples, different action are able to be taken when a difference is detected between the measured values in the second set of sensor data 320 and the calculated expected values corresponding to those independent values of the second set of sensor data 320. As is discussed in further detail below, in some examples the regression model is able to be automatically rebuilt, without operator intervention, to incorporate the second set of sensor data 320 based on the independent values of the second set of sensor data being outside the range of the independent values of the first set of sensor data 310. In some such examples, this automatic rebuilding of the regression model is performed without regard to the difference between the measured dependent values and the calculated expected values indicated by the first regression model line extended portion 314. In some such examples, this automatic rebuilding is performed during a regression model development phase that exists after, for example, retrofit or maintenance of the operational system 202 and before the regression model has been determined to be a definitive regression model.

In some examples, a prompt is sent to an appropriate entity or entities requesting instructions on handling the second set of sensor data 320 when a difference between the measured values in the second set of sensor data 320 and the calculated expected values corresponding to the independent values in the second set of sensor data 320 is detected. In some examples, such a prompt is sent only if the difference is determined to be greater than a defined threshold. In an example, the prompt is able ask whether the regression model is to be updated to include the second set of sensor data 320, whether the second set of sensor data is to be discarded, whether the second set of sensor data 320 likely reflects an anomaly and should be further investigated, whether other actions should be taken, or any combination of these.

The regression model used by the regression model 214 to calculate expected values is updated, or rebuilt, when the entity receiving the prompt indicates that the regression model is to be rebuilt. Updating the regression model to incorporate the second set of sensor data 320 in an example causes a new data modelling equation for that regression model to be determined based on a combination of the first set of sensor data 310 and the second set of sensor data 320. In the illustrated example, the updated regression model is reflected by an updated regression model line 324 to be created. The updated regression model line 324 indicates the regression model used by the regression model 214 to calculate expected values that correspond to measured values received from the monitoring system 204 after the regression model has been updated. As indicated in the example set of sensor data 300, the updated regression model line 324 calculates expected values consistent with the first set of sensor data 310 and the second set of sensor data 320.

The third set of sensor data 330 depicts a set of measured values that have independent values within the range of independent values within the first set of sensor data but have dependent values that differ from the expected values calculated according to the first regression model line 312 or the updated regression model line 324. Based upon whether the third set of sensor data 330 is received before or after the regression model is updated to include the second set of sensor data 320, the values in the second set of sensor values are compared to calculated expected values determined by either the first regression model line or the updated regression model line. In an example, receiving the third set of sensor data 330, which deviates from the presently established regression model and has independent values within the range of independent values of sensor data used to create that regression model, causes a prompt to be sent to an appropriate entity such as a system administrator. This prompt is similar to the prompt described above, and is able to ask whether the regression model is to be updated to include the second set of sensor data 320, whether the second set of sensor data is to be discarded, whether an alarm condition should be asserted based on the second set of sensor data, whether other actions should be taken, or any combination of these.

Figure 4:
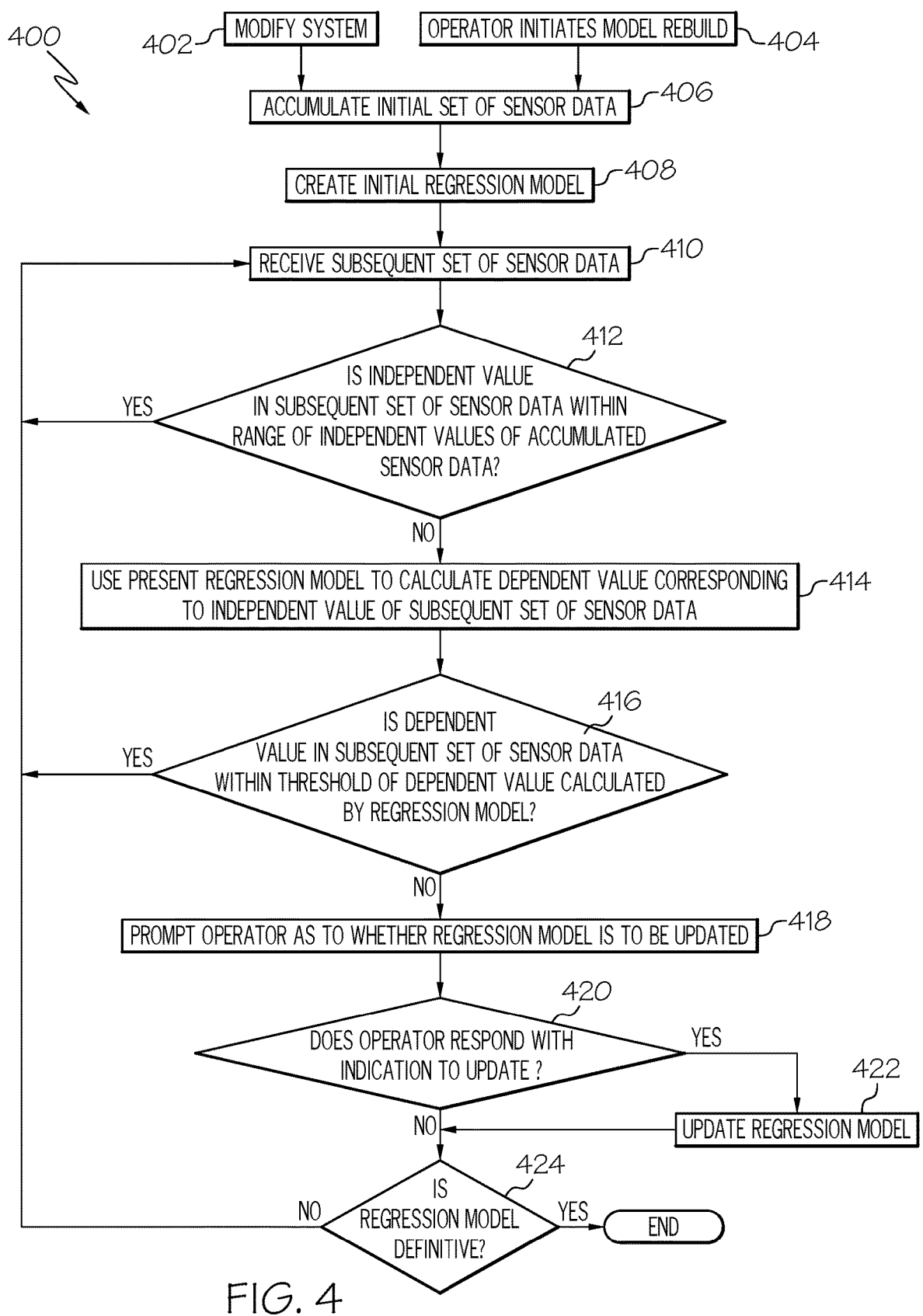
FIG. 4 illustrates an a regression model creation and development process, according to an example.

FIG. 4 illustrates a regression model creation and development process 400, according to an example. The regression model creation and development process 400 in an example is used to initially create and automatically update a regression model. The regression model creation and development process 400 allows the regression model to be used to monitor an operational system while the regression model is still being refined and updated. The regression model creation and development process 400 in an example allows automated regression model based anomaly detection using regression models that are not yet determinant while reducing interactions and oversight by expert personnel, such as system administrators, to handle received sensor data that deviates from the presently established regression model. The regression model creation and development process 400 operates over a time duration that is sufficient to properly characterize the operational system being monitored and produces a definitive regression model that is able to be used for regression based anomaly detection. The regression model creation and development process 400 is an example of a process that is at least partially performed by the regression model builder 210 described above.

The regression model creation and development process 400 is initiated in an example by either a modification, at 402, of a system being monitored by the regression model being developed, or upon an operator initiating, at 404, rebuilding of the regression model. Modification of the system, at 402, is able to include any modification that reduces a correlation between the output of the regression model and values measured by a monitoring system monitoring an operational system. Such modifications include, for example retrofit of the operational system being monitored, modification or recalibration of the monitoring system monitoring the operational system, any other modification, or combinations of these.

The regression model creation and development process 400 begins, after initiation as discussed above, by accumulating, at 406, an initial set of sensor data. In an example, an initial set of sensor data is accumulated for a twenty four (24) hour time duration. In an example, the time duration over which the initial set of sensor data is accumulated is less than a time duration over which sensor data is required to be accumulated to acceptably characterize the operational system being monitored and calibrate a regression model. In the following discussion, the time duration over which sensor data is required to be accumulated for a particular parameter of an operational system to acceptably characterize that parameter of the operational system being monitored and therefore calibrate a regression model is referred to as a calibration time duration. In the above example of a wind turbine, different annual seasons cause ambient temperatures to vary widely over a time duration of several months. In such an example, sensor data collected over 24 hours is insufficient to create a calibrated regression model that is suitable for use in regression based anomaly detection. Therefore, the initial set of sensor data accumulated over a twenty four (24) hour time period is substantially less than the calibration time duration for parameters of a wind turbine.

The initial set of sensor data in an example has at least one data element that each includes a respective independent value and a respective dependent value. The data elements in the initial set of sensor data in an example also have independent values that fall within an initial sensor data set independent value range. The initial data set independent value range in an example is defined as values that are between the lowest independent value of any data point in the initial set of sensor data and the highest independent value of any data point in the initial set of sensor data.

An initial regression model is created, at 408. The initial regression model is created in an example using the accumulated initial set of sensor data. In an initial iteration of the regression model creation and development process 400, this initial regression model is the present regression model. As the regression model creation and development process 400 iterates, this initial regression model is updated and the present regression model becomes that updated regression model that is created using multiple sets of received sensor data as is described below.

A subsequent sent of sensor data is received, at 410. The subsequent set of sensor data is able to include a single sensor reading, a set of sensor readings accumulated of a time duration, any suitable set of one or more sensor readings, or combinations of these.

A determination is made, at 412, as to whether independent values within the subsequent set of sensor data are within a range of independent values of the accumulated sensor data. In an initial iteration of the regression model creation and development process 400, the accumulated sensor data is the initial set of sensor data. As the regression model creation and development process 400 iterates, as is described below, the accumulated sensor data includes the initial set of sensor data and previously received subsequent sets of sensor data that are accumulated as the regression model creation and development process 400 operates.

If it is determined that the independent values are not within a range of independent values of the accumulated sensor data, the present regression model is used, at 414, to calculate an expected dependent value that corresponds to the independent value or values contained within the subsequent set of sensor data. A determination is made, at 416, as to whether the dependent values in the subsequent set of sensor data is within a threshold of expected dependent values calculated by the regression model.

If it is determined that the dependent values in the subsequent set of sensor data are not within a threshold of expected dependent values calculated by the regression model, an operator is prompted, at 418, as to whether the regression model is to be updated. An example of such a prompt is described in further detail below.

A determination is made, at 420, as to whether the operator responded to the prompt with an indication to update the regression model. If the operator indicates that the regression model should be updated, the regression model is updated, at 422, to include the subsequent set of sensor data.

If it is determined that the operator responded with an indication that the model is not to be updated, a determination is made, at 424, as to whether the regression model being developed is definitive. An example of determining whether the regression model is definitive is described below.

If it is determined, at 424, that the regression model is not definitive, or if it was determined, at 412, that the independent values in the subsequent set of sensor data are within a range of independent values of accumulated sensor data, or if it was determined, at 416, that dependent values in the subsequent set of sensor data are within a threshold of dependent values calculated by the regression model, the regression model creation and development process 400 returns to receiving, at 410, a subsequent set of sensor data and the subsequent processing described above. In an example, until the regression model is determined to be a definitive model, the regression model creation and development process 400 iteratively performs: receiving a new subsequent set of sensor data; determining a modeled dependent value produced by an updated regression model; and updating the regression model. If it is determined, at 424, that the regression model is definitive, the regression model creation and development process 400 end.

In some examples, the operational system operates in different environmental conditions. For example, the operational system in some locations is able to operate in different annual seasons, such as in winter and summer In some examples, operation of a system is able to be affected by aspects of the different annual seasons, such as differences in ambient temperature, precipitation, other characteristics, or combinations of these. In an example, the operational system operates in at least a first environmental condition and a second environmental condition, where the first environmental condition and the second environmental condition each comprise a different annual season. In an example of the regression model creation and development process 400 when characterizing a system that is affected by characteristics of the different annual seasons, an initial set of sensor data is accumulated during the first environmental condition and a subsequent set of sensor data corresponds to output of the sensor during the second environmental condition.

Figure 5:
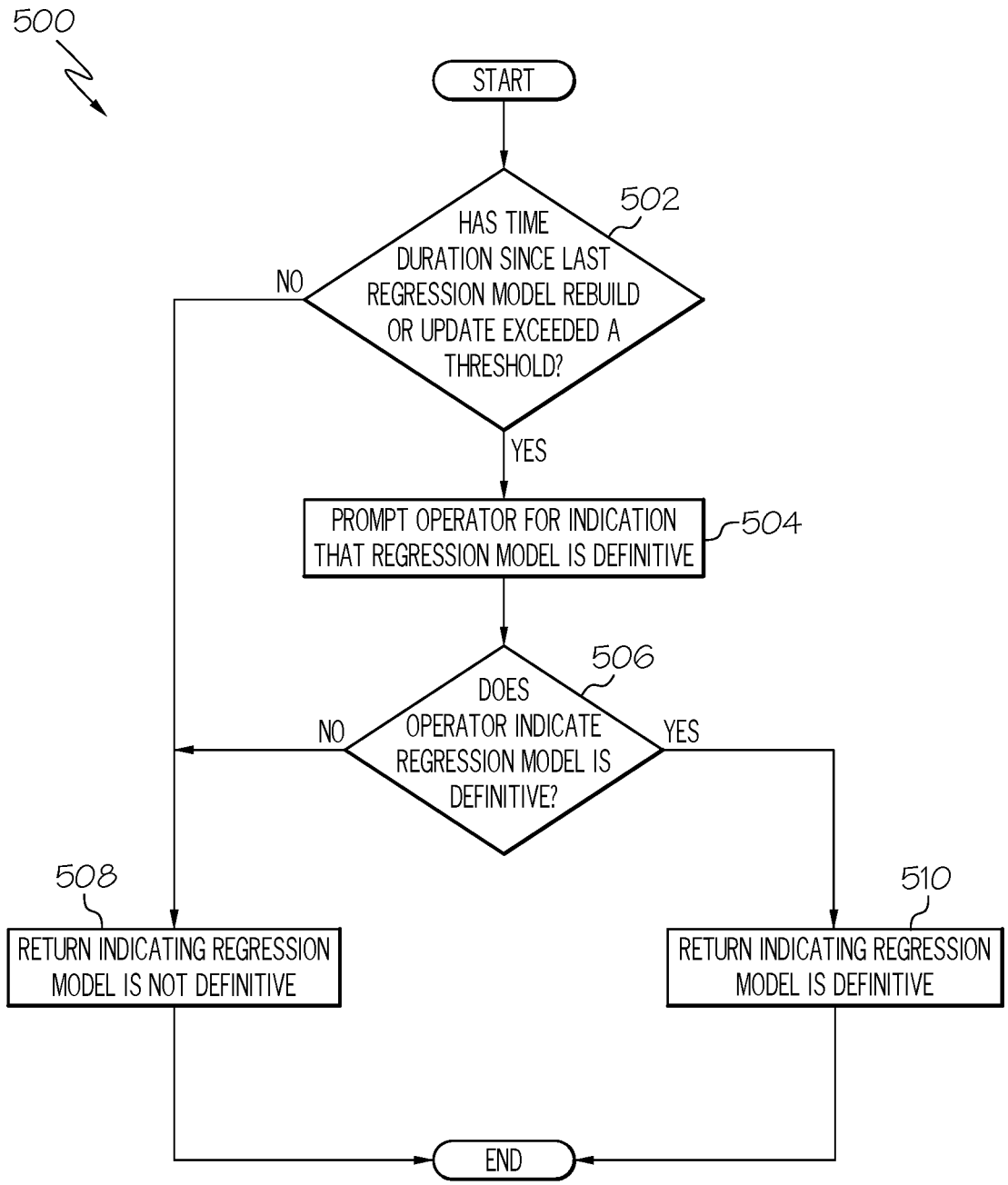
FIG. 5 illustrates a definitive model determination process, according to an example.

FIG. 5 illustrates a definitive model determination process 500, according to an example. The definitive model determination process 500 is an example of a process that is performed in association with the determining that the regression model is definitive, at 424, of the above described regression model creation and development process 400.

The definitive model determination process 500 begins by determining, at 502, whether the time duration since the regression model was last rebuilt or updated has exceeded a threshold. In an example, a regression model that operates for a particular time duration without having to be rebuilt or updated may be considered for further evaluation as to whether the model is sufficiently developed to reflect the expected operation of the operational system it is modelling, and is thus determinative. In an example, the threshold time is generally determined based upon design considerations for a regression model that is to be calibrated to model the particular parameter being characterized by the regression model development process. In an example of a wind turbine electric generator, a threshold time of one month may be chosen based upon expected seasonal changes in ambient temperatures.

If it is determined that the time duration since the regression model has been rebuilt or updated does exceed the threshold time, an operator is prompted, at 504, for an indication that the regression model is definitive. In an example, this prompt is provided to the system administrator that receives the above described prompts regarding whether the regression model should be updated to incorporate subsequent sets of sensor data, as is described with regards to step 418 of the regression model creation and development process 400. In general, the operator applies his expertise and judgement in performing a subjective assessment of the present state of development of the regression model.

A determination, at 506, is made as to whether the operator indicates that the regression model is definitive. In an example, the operator is able to respond to the prompt with a "model complete" response that indicates that the regression model is definitive. If a "model complete" response is received, the definitive model determination process 500 returns, at 510, with an indication that the regression model is definitive. The definitive model determination process 500 then ends.

Returning to the determination, at 502, as to whether the time duration since the last model rebuild or update exceeded a threshold, or whether the operator indicated, at 506, that the regression model is definitive, if either of these determinations is negative, the definitive model determination process 500 returns, at 508, with an indication that the regression model is not definitive. The definitive model determination process 500 then ends.

Figure 6:
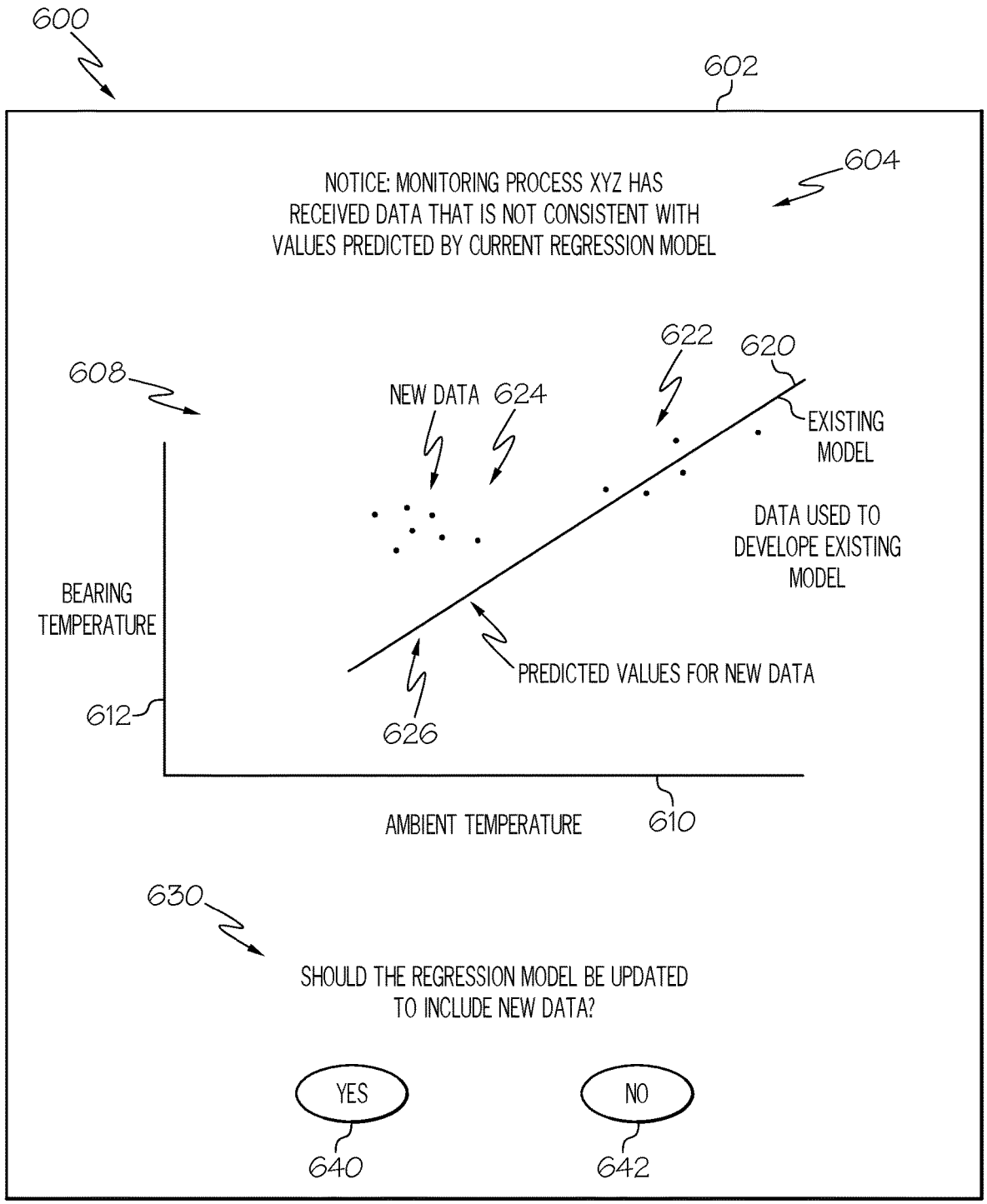
FIG. 6 illustrates a regression model update prompt, according to an example.

FIG. 6 illustrates a regression model update prompt 600, according to an example. The regression model update prompt 600 is an example of a prompt provided to an operator, such as a system administrator, as part of the prompting an operator as to whether the present regression model is to be updated, at 418, as is described above with regards to the regression model creation and development process 400. In various examples, the regression model update prompt 600 is able to be provided to the operator, or to any number of operators, by any suitable technique. In one example, the regression model update prompt 600 is provided in the form of an e-mail to the operator, where the e-mails has embedded links to allow the operator to respond to the prompt with one of several options, investigate other aspects associated with the operation of the operational system and regression model, perform other tasks, provide other options, or combinations of these. In further examples, other user interfaces are able to be provided to present the regression model update prompt 600 and receive responses from the operator.

The regression model update prompt 600 depicts a user display 602 that presents information to the operator receiving the regression model update prompt 600. As discussed above, the user display 602 is able to be any suitable interface that supports presenting information and receiving responses to the presented prompt.

The user display 602 includes a notification 604 that informs the operator of the question being posed that that requires his or her response. The notification 604 in this example identifies that data has been received that is not consistent with expected values calculated by a present regression model. The notification 604 further identifies the monitoring process with an identifier of "xyz" in this example. The identification of the monitoring process in an example facilities further research of the monitoring process, the operational system being monitored by that process, other information relevant to the prompt, or combinations of these.

The user display 602 further includes a data graph 608. The data graph 608 depicts data that is similar to some of the data discussed above with regards to the example set of sensor data 300. In the illustrated example, the regression model is used to model the relationship between the ambient temperature of a wind turbine and the measured temperature of a bearing within that wind turbine. The data graph 608 has a horizontal independent value axis 610 that is labeled "ambient temperature" and a vertical dependent value axis 612 that is labeled "bearing temperature."

The illustrated data graph 608 depicts a number of textual labels that are presented on the user display 602 in an example. In various examples, these textual labels are able to be persistently presented on the user display 602, are able to be selectively presented such as by selecting displayed elements such as data points or a line, can be alternatively presented as marks with legends, presented by any suitable technique, not presented at all, or combinations of these.

The data graph 608 depicts an existing regression model line 620 that reflects the relationship between independent values and dependent values as determined by the current regression model. The data graph 608 further depicts existing data points 622 that indicate the data that was used to create, update, or both create and update, the current regression model.

The data graph 608 includes a depiction of a new data set 624. In various examples, the new data set 624 is able to be indicated on the data graph 608 by any suitable technique. The illustrated example includes a label "new data" with an arrow pointing to the new data points. In another example, new data is able to be indicted through more graphical techniques, such as color of dots, symbols used to present the data points (e.g., using "x" to indicate new data, and "o" to indicate existing data that has been incorporated into the present regression model. The data graph 608 further includes a relevant portion indication 626 that points to the portion of the existing regression model line 620 that corresponds to the new data set 624.

The user display 602 further includes a prompt text 630. The prompt text 630 in this example asks the operator whether the regression model should be updated to include the new data set 624. The operator in this example is able to respond by either selecting a "yes" response indicator 640, or a "no" response indicator 642. In further examples, other response indicators are able to be provided. In an example, an operator provides a response that indicates that the regression model is to be updated by selecting the "yes" response indicator 640.

Figure 7:
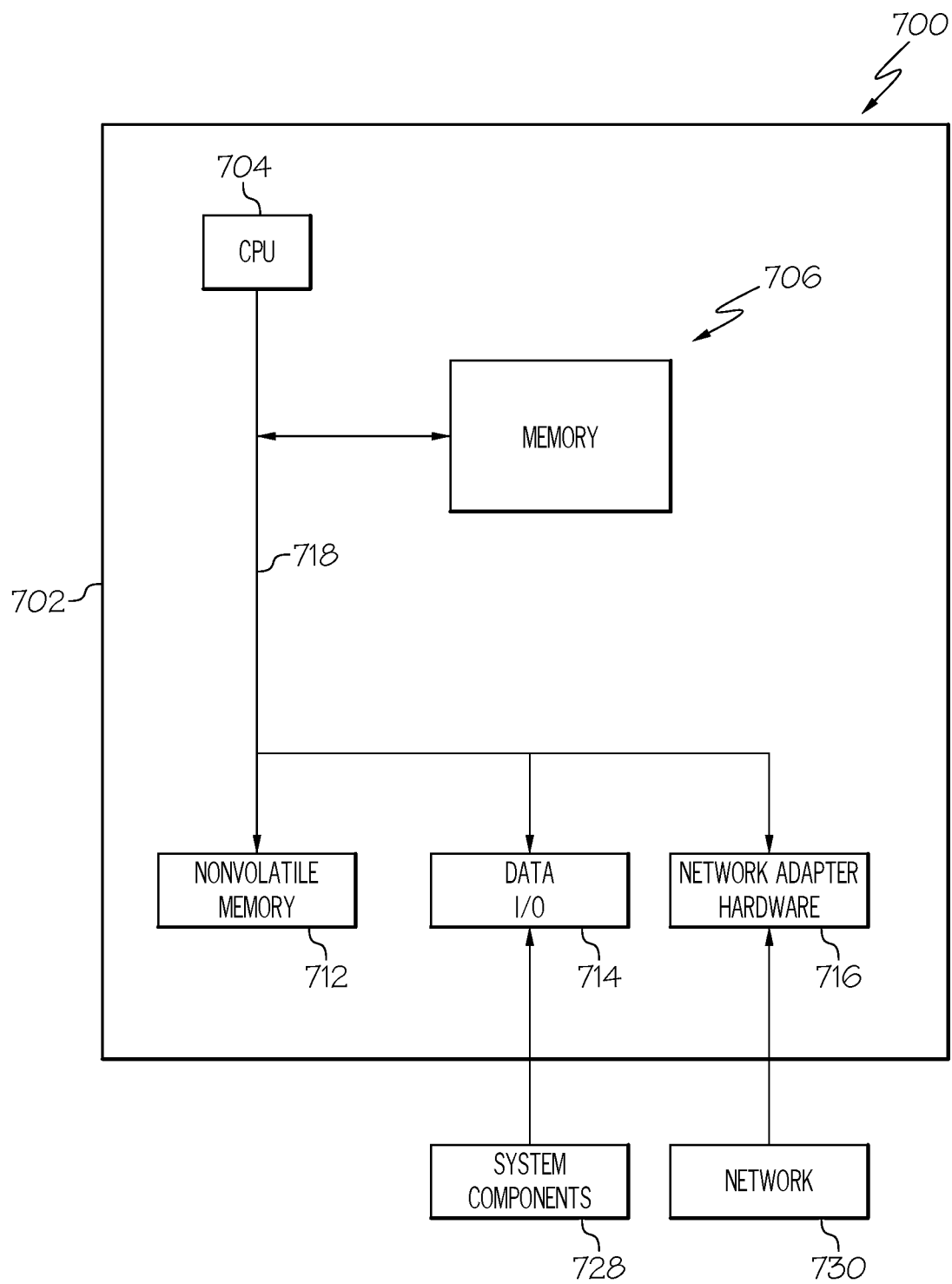
FIG. 7 illustrates a block diagram illustrating a processor, according to an example.

FIG. 7 illustrates a block diagram illustrating a processor 700 according to an example. The processor 700 is an example of a processing subsystem that is able to perform any of the above described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to a network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for providing an adaptive alarm and dispatch system for an electrical generation system that provides electric power to an electric transmission system, the method comprising:
    subsequent to a modification of the electrical generation system having a previously existing regression model, accumulating, over a first time duration, an initial set of sensor data from at least one sensor of a monitoring system that is monitoring a respective parameter of the electrical generation system, the initial set of sensor data comprising at least one data element that where each data element comprises a respective independent value and a respective dependent value, where all independent values in the initial set of sensor data are within a first independent value range;
    reconfiguring the previously existing regression model for regression based anomaly detection of the electrical generation system by:
    creating an initial regression model based on the initial set of sensor data that is calibrated over the first independent value range;
    receiving, subsequent to creating the initial regression mode, a first subsequent set of sensor data from the at least one sensor subsequent to creating the initial regression model;
    monitoring, based on the initial regression model, the electrical generation system for abnormalities indicated by differences between dependent values in the first subsequent set of sensor data and expected dependent values produced by the initial regression model for corresponding independent values in the first subsequent set of sensor data;
    receiving, from the at least one sensor after creating the initial regression model, a second subsequent set of sensor data comprising at least one subsequent independent value and at least one subsequent dependent value;
    determining that the at least one subsequent independent value in the second subsequent set of sensor data is within a second independent value range that is outside of the first independent value range;
    determining, using the initial regression model while the initial regression model is not calibrated for the second independent value range, an expected dependent value for the subsequent independent value;
    based on a difference between the at least one subsequent dependent value and the expected dependent value being greater than a threshold and based on determining that the at least one subsequent independent value in the second subsequent set of sensor data is within a second independent value range that is outside of the first independent value range, automatically presenting, to an operator, a prompt as part of a graph to an operator indicating:
the at least one subsequent dependent value and the expected dependent value; and
an option to update the initial regression model, where the graph presenting presents each of:
the initial set of sensor data;
expected dependent values based on the initial regression model in the second independent value range corresponding to the second subsequent set of sensor data; and
the second subsequent set of sensor data in relation to the expected dependent values in the second independent value range;
receiving a response to the prompt, the response comprising indicating one of:
an indication to update the initial regression model,
an indication to investigate the operation of the electrical generation system, or
an indication to discard the second subsequent set of sensor data;
in response to receiving a response indicating to update the regression model, updating, based on receiving a response to the prompting from the operator to update the regression model, the initial regression model to create an updated regression model incorporating the second subsequent set of sensor data and the initial set of sensor data;
determining if the regression model is definitive; and
in response to the regression model not being definitive:
receiving a third subsequent set of sensor data subsequent to updating the regression model;
monitoring, based on the updating and based on the updated regression model incorporating the second subsequent set of sensor data, the electrical generation system for abnormalities indicated by differences between dependent values in the third subsequent set of sensor data and expected dependent values produced by the updated regression model for corresponding independent values in the third subsequent set of sensor data; and
providing, subsequent to the updating, a notification, an alarm and dispatch to alert personnel a notification of an anomaly based on a difference between third subsequent set of sensor data and the updated regression model.

2. The method of claim 1, further comprising receiving an indication to rebuild a regression model for measurements provided by the at least one sensor in the electrical generation system, and
wherein accumulating the initial set of sensor data and creating the initial regression model is based on receiving the indication to rebuild the regression model.

3. The method of claim 1, further comprising leaving the regression model unchanged based on receiving a response to the prompting from the operator to not update the model.

4. The method of claim 1,
where the initial set of sensor data has an initial sensor data set independent value range comprising values between a lowest independent value of any data point in the initial set of sensor data and a highest independent value of any data point in the initial set of sensor data, and
wherein determining an expected dependent value produced by the initial regression model is based on the subsequent set of sensor data comprising an independent value outside of the initial sensor data set independent value range.

5. The method of claim 1, where the electrical generation system operates in at least a first environmental condition and a second environmental condition, where the first environmental condition and the second environmental condition each comprise a different annual season, and wherein the initial set of sensor data is accumulated during the first environmental condition and the subsequent set of sensor data corresponds to output of the sensor during the second environmental condition.

6. The method of claim 1, wherein accumulating the initial set of sensor data and creating the initial regression model is based on the modification of the electrical generation system.

7. The method of claim 6, wherein the modification comprises one of retrofitting the electrical generation system, modification of the at least one sensor, recalibration of the at least one sensor, modification of the monitoring system, or recalibration of the monitoring system.

8. The method of claim 1, further comprising:
prompting, subsequent to the updating, the operator requesting an indication that the updating produced a definitive model;
receiving a model complete response from the prompting the operator requesting the indication that the updating produced a definitive model; and
iteratively receiving a new subsequent set of sensor data, determining an expected dependent value produced by an updated regression model, and updating the regression model until the model complete response indicates that the updating produced a definitive model.

9. The method of claim 8, where the prompting is further based on expiration of a defined time duration since last prompting the operator requesting an indication that the updating produced a definitive model.

10. A regression based anomaly detection processor, comprising:
a processor;
a memory communicatively coupled to the processor;
a sensor data receiver that, when operating, is configured to:
sense sensor data from at least one sensor of a monitoring system monitoring a respective parameter of an electrical generation system after being modified, wherein the modification is at least one of retrofitting the electrical generation system, recalibration the electrical generation system, recalibration of a monitoring system of the electrical generation system, and overhauling the electrical generation system;
subsequent to a modification of the electrical generation system having a previously existing regression model, accumulate, over a first time duration, an initial set of sensor data from at least one sensor of a monitoring system monitoring a respective parameter of electrical generation system, the initial set of sensor data comprising at least one data element that each comprises a respective independent value and a respective dependent value, where all independent values in the initial set of sensor data are within a first independent value range;
reconfigure the previously existing regression model for regression based anomaly detection of the electrical generation system by:

receive a first subsequent set of sensor data from the at least one sensor subsequent to creating the initial regression model;

monitor, based on the initial regression model, electrical generation system for abnormalities indicated by differences between dependent values in the first subsequent set of sensor data and expected dependent values produced by the initial regression model for corresponding independent values in the first subsequent set of sensor data;

receive, from the at least one sensor, a subsequent set of sensor data comprising at least one subsequent independent value and at least one third dependent value;

determine that the at least one subsequent independent value in the second subsequent set of sensor data is within a second independent value range that is outside of the first independent value range;

determine, using the initial regression model while the initial regression model is not calibrated for the second independent value range, an expected dependent value for the subsequent independent value;

based on a difference between the at least one subsequent dependent value and the expected dependent value being greater than a threshold and determining that the at least one subsequent independent value in the second subsequent set of sensor data is within a second independent value range that is outside of the first independent value range, automatically presenting a prompt as part of a graph to an operator indicating the at least one subsequent dependent value and the expected dependent value and an option to update the initial regression model, the graph presenting each of the initial set of sensor data;

expected dependent values based on the initial regression model in the second independent value range corresponding to the third set of sensor data; and the second subsequent set of sensor data in relation to the expected dependent values in the second independent value range;

receiving a response to the prompt indicating one of:
update the initial regression model,
investigate the operation of the electrical generation system, or
discard the second subsequent set of sensor data;

update, based on receiving a response to the prompting from the operator to update the regression model, the initial regression model to create an updated regression model incorporating the second subsequent set of sensor data and the initial set of sensor data;

receive a third subsequent set of sensor data subsequent to updating the regression model;

monitor, based on the updating and based on the updated regression model incorporating the second subsequent set of sensor data, the electrical generation system for abnormalities indicated by differences between dependent values in the third subsequent set of sensor data and expected dependent values produced by the updated regression model for corresponding independent values in the third subsequent set of sensor data; and provide, subsequent to the updating a notification, an alarm and dispatch to alert personnel a notification of an anomaly based on a difference between third subsequent set of sensor data and the updated regression model.

11. The regression based anomaly detection processor of claim 10, further receives an indication to rebuild a regression model for measurements provided by the at least one sensor in the electrical generation system, and wherein the sensor data receiver is configured to, when operating, accumulate the initial set of sensor data, and create the initial regression model is based on receiving the indication to rebuild the regression model.

12. A regression based anomaly detection processor, comprising:

a processor;

a memory communicatively coupled to the processor;

a sensor data receiver that, when operating, is configured to:

sense sensor data from at least one sensor of a monitoring system monitoring a respective parameter of an electrical generation system after being modified, wherein the modification is at least one of retrofitting the electrical generation system, recalibration the electrical generation system, recalibration of a monitoring system of the electrical generation system, and overhauling the electrical generation system;

subsequent to a modification of the electrical generation system having a previously existing regression model, accumulate, over a first time duration, an initial set of sensor data from at least one sensor of a monitoring system that is monitoring a respective parameter of an electrical generation system, the initial set of sensor data comprising at least one data element that where each data element comprises a respective independent value and a respective dependent value, where all independent values in the initial set of sensor data are within a first independent value range;

reconfigure the previously existing regression model for regression based anomaly detection of the electrical generation system by:

receive, subsequent to creating the initial regression model, a first subsequent set of sensor data from the at least one sensor subsequent to creating the initial regression model;

monitor, based on the initial regression model, electrical generation system for abnormalities indicated by differences between dependent values in the first subsequent set of sensor data and expected dependent values produced by the initial regression model for corresponding independent values in the first subsequent set of sensor data;

receive, from the at least one sensor, a subsequent set of sensor data comprising at least one subsequent independent value and at least one third dependent value;

determine that the at least one subsequent independent value in the second subsequent third set of sensor data is within a second independent value range that is outside of the first independent value range;

determine, using the initial regression model while the initial regression model is not calibrated for the second independent value range, an expected dependent value for the subsequent independent value;

based on a difference between the at least one subsequent dependent value and the expected dependent value being greater than a threshold and based on determining that the at least one subsequent independent value in the second subsequent set of sensor data is within a second independent value range that is outside of the first independent value range, automatically presenting, to an operator, a prompt as part of a graph to an operator indicating:
the at least one subsequent dependent value and the expected dependent value; and
an option to update the initial regression model, where the graph presenting presents each of:
the initial set of sensor data;
expected dependent values based on the initial regression model in the second independent value range corresponding to the third set of sensor data; and
the second subsequent set of sensor data in relation to the expected dependent values in the second independent value range;
receiving a response to the prompt, the response comprising indicating one of:
an indication to update the initial regression model,
an indication to investigate the operation of the electrical generation system, or
an indication to discard the second subsequent set of sensor data;
in response to receiving a response indicating to update the regression model, update, based on receiving a response to the prompting from the operator to update the regression model, the initial regression model to create an updated regression model incorporating the second subsequent set of sensor data and the initial set of sensor data;
determining if the regression model is definitive; and
in response to the regression model not being definitive:
receive a third subsequent set of sensor data subsequent to updating the regression model;
monitor, based on the updating and based on the updated regression model incorporating the second subsequent set of sensor data, the electrical generation system for abnormalities indicated by differences between dependent values in the third subsequent set of sensor data and expected dependent values produced by the updated regression model for corresponding independent values in the third subsequent set of sensor data; and
provide, subsequent to the updating a notification, an alarm and dispatch to alert personnel a notification of an anomaly based on a difference between third subsequent set of sensor data and the updated regression model.

13. The regression based anomaly detection processor of claim 10,
where the initial set of sensor data has an initial sensor data set independent value range comprising values between a lowest independent value of any data point in the initial set of sensor data and a highest independent value of any data point in the initial set of sensor data, and
wherein an expected dependent value is produced by the initial regression model is based on the subsequent set of sensor data comprising an independent value outside of the initial sensor data set independent value range.

14. The regression based anomaly detection processor of claim 10, where the electrical generation system operates in at least a first environmental condition and a second environmental condition, where the first environmental condition and the second environmental condition each comprise a different annual season, and wherein the initial set of sensor data is accumulated during the first environmental condition and the subsequent set of sensor data corresponds to output of the sensor during the second environmental condition.

15. The regression based anomaly detection processor of claim 10, wherein the sensor data receiver accumulates the initial set of sensor data, and is further configured to create the initial regression model based on the modification of the electrical generation system.

16. The regression based anomaly detection processor of claim 15, wherein the modification comprises one of retrofitting the electrical generation system, modification of the at least one sensor, recalibration of the at least one sensor, modification of the monitoring system, or recalibration of the monitoring system.

17. The regression based anomaly detection processor of claim 10 is further configured to:
prompt, subsequent to an update of the initial regression model, the operator requesting an indication that the updating produced a definitive model;
receive a model complete response from the prompt to the operator requesting the indication that the updating produced a definitive model; and
iteratively receive a new subsequent set of sensor data, determine an expected dependent value produced by an updated regression model, and update the regression model until the model complete response indicates that the update produced a definitive model.

18. The regression based anomaly detection processor of claim 17 is further configured to prompt the operator is prompted based on expiration of a defined time duration since previously prompting the operator requesting an indication that the updating produced a definitive model.

19. A computer program product for providing an adaptive alarm and dispatch system for an electrical generation system that provides electric power to an electric transmission system, the computer program product comprising:
a computer readable storage medium having computer readable program code embodied therewith, the computer readable program code comprising instructions for:
subsequent to a modification of the electrical generation system having a previously existing regression model, accumulating, over a first time duration, an initial set of sensor data from at least one sensor of a monitoring system that is monitoring a respective parameter of a respective mechanical part of an electrical generation system, the initial set of sensor data comprising at least one data element that where each data element comprises a respective independent value and a respective dependent value, where all independent values in the initial set of sensor data are within a first independent value range;
reconfiguring the previously existing regression model for regression based anomaly detection of the electrical generation system by:
creating an initial regression model based on the initial set of sensor data that is calibrated over the first independent value range;
receiving, subsequent to creating the initial regression mode, a first subsequent set of sensor data from the at least one sensor subsequent to creating the initial regression model;
monitoring, based on the initial regression model, the electrical generation system for abnormalities indicated by differences between dependent values in the first subsequent set of sensor data and expected dependent values produced by the initial regression model for corresponding independent values in the first subsequent set of sensor data;

receiving, from the at least one sensor after creating the initial regression model, a third second subsequent set of sensor data comprising at least one subsequent independent value and at least one subsequent dependent value, where the at least one subsequent independent value in the subsequent set of sensor data is outside of the first independent value range;

determining that the at least one subsequent independent value in the subsequent set of sensor data is within a second independent value range that is outside of the first independent value range;

determining, using the initial regression model while the initial regression model is not calibrated for the second independent value range, an expected dependent value for the subsequent independent value;

based on a difference between the at least one subsequent dependent value and the expected dependent value being greater than a threshold and based on determining that the at least one subsequent independent value in the second subsequent set of sensor data is within a second independent value range that is outside of the first independent value range, automatically presenting, to an operator, a prompt as part of a graph to an operator indicating:

the at least one subsequent dependent value and the expected dependent value and an option to update the initial regression model, where the graph presenting presents each of:

the initial set of sensor data;

expected dependent values based on the initial regression model in the second independent value range corresponding to the third set of sensor data; and the second subsequent of sensor data in relation to the expected dependent values in the second independent value range;

receiving a response to the prompt, the response comprising indicating one of:

an indication to update the initial regression model, an indication to investigate the operation of the electrical generation system, or an indication to discard the second subsequent set of sensor data;

in response to receiving a response indicating to update the regression model, updating, based on receiving a response to the prompting from the operator to update the regression model, the initial regression model to create an updated regression model incorporating the third second subsequent set of sensor data and the initial set of sensor data;

determining if the regression model is definitive; and in response to the regression model not being definitive:

receiving a third subsequent set of sensor data subsequent to updating the regression model;

monitoring, based on the updating and based on the updated regression model incorporating the second subsequent set of sensor data, the electrical generation system for abnormalities indicated by differences between dependent values in the third subsequent set of sensor data and expected dependent values produced by the updated regression model for corresponding independent values in the third subsequent set of sensor data; and providing, subsequent to the updating a notification, an alarm and dispatch to alert personnel a notification of an anomaly based on a difference between third subsequent set of sensor data and the updated regression model.

20. The computer program product of claim 19, where the initial set of sensor data has an initial sensor data set independent value range comprising values between a lowest independent value of any data point in the initial set of sensor data and a highest independent value of any data point in the initial set of sensor data, and wherein determining an expected dependent value produced by the initial regression model is based on the subsequent set of sensor data comprising an independent value outside of the initial sensor data set independent value range.

\* \* \* \* \*